United States Patent
Hatfield et al.

(10) Patent No.: US 12,456,272 B2
(45) Date of Patent: Oct. 28, 2025

(54) OBJECT MODIFICATION IN A SMART ENVIRONMENT

(71) Applicant: International Business Machines Corporation, Armonk, NY (US)

(72) Inventors: Jennifer M. Hatfield, San Francisco, CA (US); Jeremy R. Fox, Georgetown, TX (US); Tushar Agrawal, West Fargo, ND (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 18/066,745

(22) Filed: Dec. 15, 2022

(65) Prior Publication Data
US 2024/0203076 A1    Jun. 20, 2024

(51) Int. Cl.
*G06T 19/20* (2011.01)
*G06T 19/00* (2011.01)

(52) U.S. Cl.
CPC ............ *G06T 19/20* (2013.01); *G06T 19/003* (2013.01); *G06T 19/006* (2013.01)

(58) Field of Classification Search
CPC ...... G06T 19/20; G06T 19/003; G06T 19/006
See application file for complete search history.

(56) References Cited

U.S. PATENT DOCUMENTS

| | | | |
|---|---|---|---|
| 6,768,486 B1 * | 7/2004 | Szabo | G06T 17/20 345/643 |
| 9,911,243 B2 | 3/2018 | Vats | |
| 10,254,941 B2 | 4/2019 | Bowen | |
| 10,534,809 B2 | 1/2020 | Wiesel | |
| 10,817,921 B2 | 10/2020 | Collier | |
| 2018/0059644 A1 | 3/2018 | Lection | |
| 2018/0284692 A1 | 10/2018 | Kline | |
| 2020/0004225 A1 * | 1/2020 | Buller | B22F 5/04 |
| 2022/0032548 A1 | 2/2022 | Goyal | |
| 2022/0245903 A1 * | 8/2022 | Saxena | G06F 9/5016 |
| 2022/0255995 A1 * | 8/2022 | Berliner | G06T 19/20 |

OTHER PUBLICATIONS

Amir, et al., "A Low Power, Fully Event-Based Gesture Recognition System", CVPR 2017, Nov. 6, 2017, pp. 7243-7252, <https://research.ibm.com/interactive/dvsgesture/>.
Anonymous, "A Method and System for Enabling 3D Printing with Feedback and Modification in VR", An IP.com Prior Art Database Technical Disclosure, IP.com No. IPCOM000253627D, IP.com Electronic Publication Date: Apr. 17, 2018, 3 pages.

(Continued)

*Primary Examiner* — Matthew Salvucci
(74) *Attorney, Agent, or Firm* — Stosch Sabo

(57) ABSTRACT

A processor may receive an object dataset based on an object. The processor may generate an interactive model of the object to display to a user using the object dataset. The processor may receive an interaction dataset associated with the user interacting with the interactive model. The processor may analyze the interactive data to identify one or more modifications to the one or more parameters of the object, based on the user interacting with the interactive model.

18 Claims, 4 Drawing Sheets

(56) References Cited

OTHER PUBLICATIONS

Baron, Jessica, "How Digital Twins Will Revolutionize 3D Manufacturing", [Accessed May 27, 2022], Published Feb. 26, 2021, 10 pages, <https://all3dp.com/1/digital-twins-in-3d-manufacturing/>.

Brownlee, Jason, "A Tour of Generative Adversarial Network Models", Machine Learning Mastery, Last Updated on Jul. 12, 2019, 22 pages, <https://machinelearningmastery.com/tour-of-generative adversarial-network-models/>.

IBM, "Computer Vision & Multimedia", IBM Research blog, last updated May 3, 2018, 7 pages, <https://researcher.watson.ibm.com/researcher/view_group_subpage.php?id=9482>.

IBM, "IBM Maximo Application Suite: Remote monitoring", retrieved from internet Sep. 30, 2022, 6 pages, <https://www.ibm.com/products/maximo/remote-monitoring>.

IBM, "IBM Sterling Configure, Price, Quote", last retrieved from internet Sep. 30, 2022, 2 pages, <https://www.ibm.com/products/configure-price-quote>.

Kantaros, et al., "3D Printing and Implementation of Digital Twins: Current Trends and Limitations", Applied System Innovation, vol. 5, Issue 1, Article 7, 13 pages, <https://www.mdpi.com/2571-5577/5/1/7>.

Karpathy, et al., "Generative Models", OpenAI, Jun. 16, 2016, 12 pages, <https://openai.com/blog/generative-models/>.

Khan, Jamshed, "StyleGAN: Use machine learning to generate and customize realistic images", Hearbeat, Jul. 31, 2019, 15 pages, <https://heartbeat.comet.ml/stylegans-use-machine-learning-to-generate-and-customize-realistic-images-c943388dc672>.

Li, et al., "Image-Based 3D Shape Generation Used for 3D Printing", In: Li, L., et al., (eds), Methods and Applications for Modeling and Simulation of Complex Systems, AsiaSim 2018, Communications in Computer and Information Science, vol. 946, 2018, pp. 539-551, <https://link.springer.com/chapter/10.1007/978-981-13-2853-4_42>.

Lin, et al., "Design of Hand Gestures for Manipulating Objects in Virtual Reality", HCI 2017: Human-Computer Interaction. User Interface Design, Development and Multimodality, First Online: May 14, 2017, pp. 584-592, <https://link.springer.com/chapter/10.1007/978-3-319-58071-5_44>.

Oh, et al., "Deep Generative Design: Integration of Topology Optimization and Generative Models", Computer Science, Machine Learning, Version 2, Last revised May 20, 2019, 22 pages, <https://arxiv.org/abs/1903.01548>.

Okutani et al., "Stereoscopic Capture in Projection Mapping", in IEEE Access, vol. 6, Nov. 30, 2018, pp. 65894-65900, <https://ieeexplore.ieee.org/document/8491263>.

PACKT_PUB, "Inside the Generative Adversarial Networks (GAN) architecture", Medium.com, Nov. 19, 2019, 6 pages, <https://medium.com/@Packt_Pub/inside-the-generative-adversarial-networks-gan-architecture-2435afbd6b3b>.

Pappu, et al., "Haptic interaction with holographic video images", Proceedings of SPIE, vol. 3293, Practical Holography XII, Mar. 18, 1998, pp. 38-45.

Slambekova, et al., "Gaze and Gesture Based Object Manipulation in Virtual Worlds", VRST '12: Proceedings of the 18th ACM symposium on Virtual Reality Software and Technology, Dec. 2012, pp. 203-204, <https://dl.acm.org/doi/10.1145/2407336.2407380>.

Unkown, "Play with Generative Adversarial Networks in Your Browser!", Polo Club, Github, last retrieved from internet Sep. 30, 2022, 8 pages, <https://poloclub.github.io/ganlab/>.

IBM "Predictive maintenance with IBM Maximo Application Suite", Advance your journey to predictive maintenance, Apr. 9, 2025, 07 pages.

Venture Radar "Top holograms Companies", Apr. 9, 2025, 06 pages, https://www.ventureradar.com/keyword/holograms.

No Author, "Watson Visual Recognition", https://web.archive.org/web/20200718085354/https://www.ibm.com/dk-en/cloud/watson-visual-recognition, dated Jun. 2, 2025, 3 pages.

* cited by examiner

OBJECT MODIFICATION IN A SMART ENVIRONMENT

BACKGROUND

The present disclosure relates generally to smart environments, and more specifically to smart environments utilizing 2 Dimensional (2D) and/or 3 Dimensional (3D) technology (e.g., virtual reality (VR), augmented reality (AR), and/or holographic images).

The development of 2D and 3D related technology has changed how people interact with their environment. As this technology has grown in popularity, so too has demand to configure such technology to solve daily problems. While many 2D or 3D applications are often associated with entertainment (e.g., video games), 2D or 3D technology has also been adopted across industries to address various business needs.

SUMMARY

Embodiments of the present disclosure include a method, computer program product, and system for modifying an object.

A processor may receive an object dataset based on an object. The processor may generate an interactive model of the object to display to a user using the object dataset. The processor may receive an interaction dataset associated with the user interacting with the interactive model. The processor may analyze the interactive data to identify one or more modifications to the one or more parameters of the object, based on the user interacting with the interactive model.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
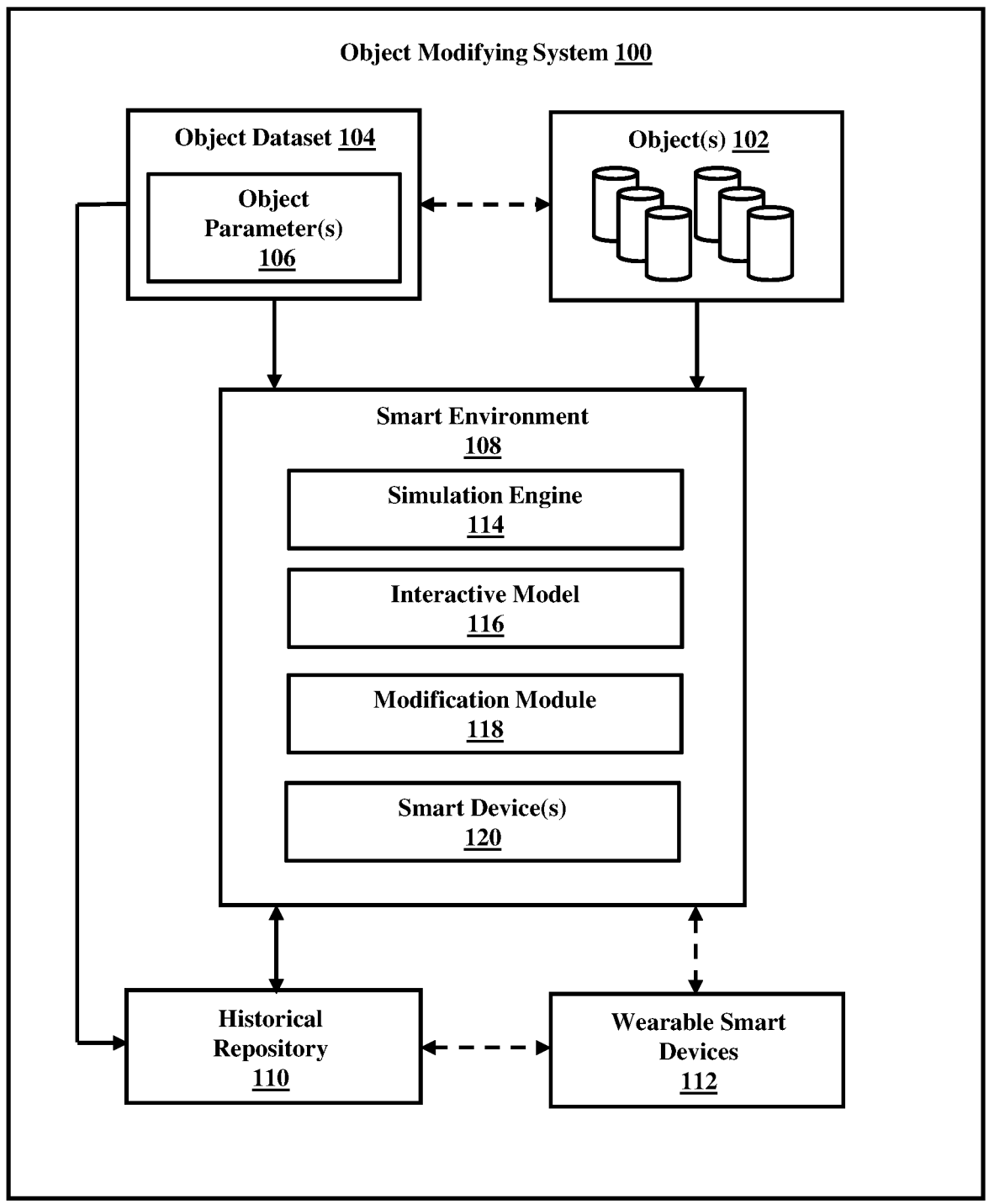
FIG. 1 depicts a block diagram of an embodiment of an object modifying system, in accordance with the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to smart environments, and more specifically smart environments utilizing intelligent environments that may be configured using virtual reality (VR), augmented reality (AR), and/or holographic images. While the present disclosure is not necessarily limited to such applications, various aspects of the disclosure may be appreciated through a discussion of various examples using this context.

Current technology allows customers to view images of products (e.g., objects) online before purchasing the product. While some products have the option to change basic aspects of the produce, these aspects are often limited to only a couple of options. For example, a user may have the option to choose between a couple of colors the product may come in (e.g., black and white) or the size of the product (e.g., small, medium, or large product). Unfortunately, current methods are unable to provide users with any ability to truly customize products without the user explicitly dictating their desired customizations or modifications to the manufacturer of the product. For example, current technology often prevents a user from selecting a specific shape, dimensions, colors, and textures (e.g., surface textures).

While such complex customization or modifications are often not available, when customization is available the complexity of such product orders often require special treatment and excessive time to determine if the customizations or modifications are functional (e.g., determining whether the product/object structurally sound). Such determinizations often require the time and input of an expert in the field of the product.). As such, a solution is desired to enable a user to alter a product or object prior to obtaining (e.g., manufacturing or purchasing) the product or object.

Before turning to the FIGS. it is noted that the benefits/novelties and intricacies of the proposed solution are that:

The object modifying system may be configured to generate a display of an object. The display may be a 2 Dimensional (2D), 3 Dimensional (3D), or holographic in nature. The object modifying system may be configured to receive an input from a user (e.g., via a user interacting with the display). The object modifying system may be configured with a Generative Adversarial Networks (GAN) module. The object modifying system may configure the GAN module to render the display of the object. The object modifying system may be configured to receive user interactions (e.g., finger or voice based interactions) to customize or alter the displayed object (e.g., shape, dimension, etc.).

The object modifying system may be configured to receive user interactions (e.g., finger or hand movement patterns) associated with the displayed object using the GAN module. The object modifying system may be configured to analyze the user interactions and update the displayed object to reflect changes or modifications the user would like to make to the object.

The object modifying system may configure wearable devices (e.g., smart watch) to track applied force, pressure when the user is interacting with the displayed object. In some embodiments, the GAN module may be configured to receive user interaction data (e.g., force, pressure, hand pattern, etc.) feed from the wearable device(s).

The object modifying system may be configured to combine multiple displays (e.g., one or more 2D, 3D, and/or holographic images) to form the displayed object. In some embodiments, while interacting with the displayed object (e.g., initial model) the system may provide the user with multiple models of different objects. In some embodiments, the system may generate (e.g., using the GAN module) a combined model of all of the different objects. The GAN module may then alter the shape and the dimensions of the object.

The object modifying system may be configured to enable surface texture feedback. The object modifying system may be configured to enable a user to customize or alter the displayed object's surface profiles, color, and/or textures. This may be accomplished using the GAN module. The GAN module may render the modified surface profile in the displayed object to allow the user to interact with. The modified surface profile may be experienced by the user via haptic feedback and/or alert mechanisms.

The object modifying system may analyze the user's interaction (e.g., user interaction data) with the displayed object. Using this analysis, the object modifying system may be configured to identify the user's preferences and user behavior to recommend customization options for modification of the displayed object.

The object modifying system may use historical information (e.g., historical user interaction data) to perform a historical analysis to generate refinement recommendations. The object modifying system may use repeated user interactions to recommend an enhanced or modified version of the product based on existing product usage patterns, contextual situations, and increased user need for specific modifications.

The object modifying system may analyze usage patterns for existing products. The object modifying system may perform various analyses (e.g., using AI and machine learning techniques) to determine existing object wear and tear to predict modifications for optimum user, overall increased satisfaction, and long-term object durability factors.

Referring now to FIG. 1, illustrated is a block diagram of an example object modifying system 100, in accordance with aspects of the present disclosure. FIG. 1 provides an illustration of only one implementation and does not imply any limitations with regard to the environments in which different embodiments may be implemented. Many modifications to the depicted environment may be made by those skilled in the art without departing from the scope of the invention as recited by the claims.

In embodiments, object modifying system 100 may include one or more objects 102, object dataset 104, smart environment 108 (e.g., using a GAN module), historical repository 110, and wearable devices 112. In these embodiments, object modifying system 100 may generate an interactive model of an object that allows a user to modify the object and view, via smart environment 108 (e.g., interactive model 116), how the particular modification would impact the object. For example, a user may be interested in purchasing an office desk that fits in their small office. The user may find a desk they like, but the desk is slightly too large to fit into the small office. In this example, object modifying system 100 may generate an interactive model of the desk and display it to the user. The user may then interact (e.g., via hand patters, voice, etc.) with the interactive model of the desk to make changes or modifications to the desk. For example, the user may use their fingers to indicate the length of the desk should be shortened.

Object modifying system 100 may be configured to receive this interaction (e.g., interaction dataset collected via smart devices 120 and/or wearable devices 112), and update the interactive model to reflect the shortened desk length (e.g., modification). By displaying the updated interactive model of the desk with the shortened desk length, the user may determine if this desk sufficiently addresses their needs (e.g., does not need further modifications to fit into small office). If the user is satisfied, object modifying system 100 may generate the modified desk (e.g., modified design plan) and issue the modifications to the producer or manufacturer of the desks.

In embodiments, object modifying system 100 may be configured as an independent system, as part of a computing device, or a combination of one or more computing devices. A computing device may include any device such as a laptop, tablet, or an AI assistance device (e.g., Google home®, Amazon Alexa®, Siri®, Bixby®, etc.). While embodiments herein often refer to a single computing device, any number of computing devices may be used, either independently or in concert with other smart devices (e.g., smart devices 102, wearable devices 112, etc.).

In embodiments, one or more objects 102 may include any physical or intangible item or product. For example, one or more objects 102 may include, but are not limited to furniture, computer software (e.g., webpages), vehicles (e.g., cars, trucks, delivery vans), clothes, etc. While embodiments contemplated herein often refer to an interactive model representing a single object (hereinafter referred to as object 102), such embodiments are used for brevity only and should not be construed as limiting, as any number of objects may be represented/displayed in the interactive model.

In embodiments, object modifying system 100 may be configured to receive input from a user regarding what object (e.g., object 102) the user may wish to view in intellectual environment 108. This user input or request may be collected using one or more smart devices (e.g., smart device 120 and/or wearable devices 112). A user may identify the desired object 102 based on a voice request or the user submitting a text search. For example, a user may search an object on a separate device, such as a tablet, and send the object to object modifying system 100. In some embodiments, a user may query an AI assistant device to perform an internet search. Based on this query (e.g., voice and/or textual), object modifying system 100 may search the internet to produce an object list for the user. In such embodiments, the user may then select the object from the object list.

In embodiments, once the user has selected object 102, object modifying system 100 may be configured to receive an object dataset 104 associated with object 102. Object dataset 104 may include object parameters 106 which may include any information or data type that may be needed to generate the interactive model of object 102. In embodiments contemplated herein object dataset 104 may include, but is not limited to: i) information/data associated with object blueprint or design documents (e.g., original dimensions of object 102); ii) information/data associated with materials object 102 may be manufactured or produced from (e.g., a desk may be made from oak, pine, or nonorganic material); iii); information/data generated from various analyses and/or simulations contemplated herein, such as information/data generated by AI and machine learning analyses via simulation engine 114 configured using a GAN module to generate interactive model 116 (e.g., interactive dataset) iv) information/data associated with databases having information/data associated with the same or similar objects; v) information/data associated with modification limitations (e.g., manufacturing limitations, structural limitations, object owner restrictions); vi) information/data associated with validity testing; vii) information/data associated with historical repository 110; viii) and/or any combination thereof. While in some embodiments, object modifying system 100 may receive/collect object dataset 104 from a database, in other embodiments, object modifying system 100 may receive/collect object dataset 104 (e.g., one or more object parameters 106) from one or more smart devices (e.g., IoT devices, sensors, etc.). These smart devices may be used to collect one or more object parameters associated with object 102.

In embodiments, object modifying system 100 may be configured to store historical object dataset (e.g., historical interactive dataset) in historical repository 110. Historical repository 110 may include any object data and/or interactive data contemplated herein. In embodiments, object modifying system 100 may access the historical repository to generate one or more simulations using AI and machine learning capabilities (e.g., via simulation engine 114 and/or modification module 118). The information used and generated from these analyses may be considered interactive data or object data and may also be stored within historical repository 110.

In embodiments, object modifying system 100 may configure smart environment 108 to generate an interactive model associated with object 102. In embodiments, object modifying system 100 may enable smart environment 108 using AI and machine learning technology such as generative adversarial networks (GANs) to perform the various analyses and/or simulations contemplated herein. A GAN module may be configured to utilize methods of deep learning to perform generative modeling and deep learning such as CNNs (convolutional neural networks).

In embodiments, smart environment 108 may include simulation engine 114, interactive model 116, modification module 118, and one or more smart devices 120. Smart environment 108 may refer to any area or space having one or more smart devices 120 that may be configured to generate an interactive model of object 102. Smart device 120 may include, but are not limited to, IoT devices/feeds, ultrasound, infrared cameras, various sensors (e.g., temperature and/or chemical sensors), AR devices, VR devices, holographic devices, or any other similarly configured smart device.

In embodiments, simulation engine 114 may be configured to receive object data set 104 associated with a particular object. In embodiments, object modifying system 100 may use AI and machine learning (e.g., GAN modules) to analyze object dataset 102 and to generate an interactive model 116 of object 102. Interactive model 116 may refer to any 3D representation of object 102. Object modifying system 100 may generate interactive model 116 by utilizing smart devices, such as AR devices, VR devices, holographic display, or any combination thereof, of object 102 that may be displayed to a user using one or more smart devices 120 (e.g., an AR/VR headset or a holographic device.

In embodiments, object modifying system 100 may be configured to receive/collect (e.g., via one or more smart devices 120) an interactive dataset associated with the user interacting with interactive model 116. The interactive dataset may include, but is not limited to, data associated with a user's finger touch, finger and hand movement (e.g., the path and pattern of the movement), force applied by the finger(s) and/or hand(s), directional force on the interactive model of the object, and finger and/or hand speed as the user moves through and/or around interactive mode 116 this data may be collected using smart device 120. For example, a user's interaction with interactive model 116 (e.g., 3D model of object 102) may be tracked using ultrasound scanning devices or sensors that may be used to track a user's finger and/or hand movement. In some embodiments, smart environment 108 (e.g., interactive model 116) may be configured to receive this interactive dataset (e.g., via a GAN module).

In some embodiments, object modifying system 100 may be configured to receive an interactive dataset from one or more wearable devices 112. Wearable devices 112 may be used to track the user's finger and/or hand movement and patterns when a user is interacting with interactive model 116. While in some embodiments wearable devices 112 may be associated with a smart device in other embodiments, wearable devices 112 may be configured independently of one or more smart devices 120. Wearable devices 112 may include, but are not limited to, smart watches, smart jewelry, fitness trackers, smart clothing, and/or body-mounted sensors (e.g., sensors attached to the user's fingertips). In some embodiments, the interactive dataset may be stored in historical repository 110 to be used in future analyses.

In some embodiments, object modifying system 100 may be configured to analyze the interactive dataset (e.g., type of object data) to identify one or more modifications to the object parameters 106 of object 102. These modifications may be based on changes or alterations the user indicated should be made to the interactive model 116 of object 102 as they were interacting with the 3D version of object 102. For example, in some embodiments, object 102 may be a wooden desk. The wooden desk may have object parameters 106 that include, but are not limited to, the shape of the desk (e.g., L-shaped desk, oval desk, rectangle desk, etc.), the type of wood, color of desk, dimensions of the desk (e.g., width, height, and length), and desk materials (e.g., wooden desktop with metal frame). In embodiments, modification module 118 may be configured to analyze and interpret the interactive dataset to determine how the interactive model 116 should be modified (e.g., what modifications the user intended with their interactions with interactive model 116). A modification may refer to altering one or more of object parameters 106 of object 102. Using the above example where object 102 is a wooden desk, a user may interact with interactive model 116, object modifying system 100 may analyze the interactive dataset to determine that a user is using a hand motion to indicate a change in the color of the wooden desk from the original white color to green.

In embodiments, once object modifying system 100 has identified or interpreted what modifications the user intended to make (e.g., change desk color from white to green), object modifying system 100 may be configured to update interactive model 116 based, at least in part, on the one or more modifications indicated by the user. Using the above example, object modifying system 100 updates the interactive model to display the wooden desk with the green color, as indicated by the user.

In embodiments, object modifying system 100 may be configured to generate a modified design of object 102. In these embodiments, object modifying system 100 may update the initial interactive model of object 102 (e.g., original design of object 102) with the one or more modifications the user indicated with their interactions with interactive model 116. The modified design may be used by a producer/manufacturer to generate the modified object/product that the user indicated using interactive model 116. While in some embodiments, object modifying system 100 may receive design plans (e.g., object parameters) associated with object 102 as part of object dataset 104, in other embodiments, object modifying system 100 may use object dataset 104 to generate the design plans associated with object 102 that may be used to generate interactive model 116. Modified design may include the design of object 102 after the user has performed one or more modifications to interactive model 116 of object 102. In embodiments, once a user has finalized their modifications to interactive model 116 of object 102, object modifying system 100 may produce the modified object based on the modified design. In these embodiments, a user may make their modifications to object 102 and object modifying system 100 may send the modified design plans to a manufacturer to manufacture the modified object for the user.

In some embodiments, object modifying system 100 may be configured to analyze the modified design of object 102 for a level of object integrity. The level of object integrity may refer to whether the modified object is qualified to be produced or manufactured. While in some embodiments, one or more of the modifications made to object 102 may result in the object having an unstable structure (e.g., modified desk material cannot withstand weight of a desktop computer), in other embodiments, the one or more modifications made to object 102 may not be possible. For example, the one or more modifications made to object 102 may not be possible if the modification is not manufacturable (e.g., manufacturer does not have a machine capable of producing a component of the object) and/or if the materials necessary to adhere to the user's modification is not available (e.g., the user modifies object 102 to be manufactured with plastic, but only wood is available). In embodiments, modified designs that are determined to have a level of object integrity that exceeds a minimum threshold level may be determined to be producible. These modified designs may be manufactured or selected by a producer (e.g., selected from an inventory of objects having different modifications) for the user based on the modifications made to interactive model 116.

Alternatively, in embodiments where object modifying system 100 determines that the modified design has a level of object integrity that does not exceed a minimum threshold level may not be produced or manufactured. In some embodiments, object modifying system 100 may be configured to analyze the modified design and object dataset 106 to determine one or more recommended modifications. The one or more recommendations may be issued to the user via notifications (e.g., via interactive model 116 and/or smart device 120). A recommended modification may include a change or an adjustment to the modified design that may allow the modified design to have a level of object integrity that exceeds the minimum threshold level. While in some embodiments, the one or more recommended modifications may be issued to the one or more users via a smart device, in other embodiments, object modifying system 100 may be configured to display the one or more recommended modifications in the smart environment and/or as part of the interactive model 116. A user may be issued a notification (e.g., via interactive model 116 and/or smart device 120) indicating whether the modified design exceeds or does not exceed the minimum threshold (e.g., whether the modified design of object 102 is producible).

In an example embodiment where object 102 is a lamp (e.g., object 102), object modifying system 100 may determine the user's modifications (e.g., modified design) to the lampstand of the lamp result in the lamp as a whole being unbalanced Object modifying system 100 may assign this modified design of the lamp a level of integrity associated with the lamp's likelihood to tip over. In this example, object modifying system 100 may determine that the level of integrity associated with the modified design of the lamp does not exceed a minimum threshold level. In these embodiments, object modifying system 100 may use simulation engine 114 to analyze the object dataset 106 and generate one or more recommended modifications that may minimize the likelihood of the lamp tipping over.

A recommended modification may include any modification that allows the modified object/modified design to be producible (e.g., meet or exceed the minimum threshold). In this immediate example, a recommended may include using a different lampstand. Object modifying system 100 may display these one or more recommended modifications to the user in the interactive model. For example, if multiple recommended modifications are generated, they may be displayed in such a way that allows a user to select and inspect which of the one or more recommendations they want. Once a user has selected the one or more recommendations, or alternatively addressed the level of integrity of the modified design/modified object by further modifying object 102 (e.g., meets or exceeds the minimum threshold), object modifying system 100 may process the modified design (e.g., produce, order, or manufacture the object based on the modified design).

In some embodiments, object modifying system 100 may access one or more user profiles associated with one or more users modifying object 102. A user profile may be comprised of historical object data (e.g., object dataset 104) associated with modifications (e.g., one or more user preferences) a user has made to various objects in the past. In these embodiments, object modifying system 100 may be configured to analyzing the user profile (e.g., user preferences) associated with the user and automatically generate one or more object options to the user. The one or more user preferences may be compiled by a user establishing their own preferences (e.g., preferred color scheme), by analyzing object dataset 106 using AI and machine learning capabilities, or any combination thereof.

An object option may include any suggested modification to object 102 that may be based on a user previously indicating the modification on a different object (e.g., user preferences). For example, a user may have previously customized/modified various furnishings using object modifying system 100 where their furniture was all a particular color and fabric type. Object modifying system 100 may identify the particular colors and fabric type as one or more user preferences (e.g., stored in a user profile), then based on object dataset 104, object modifying system 100 may modify the object user selects to interact with in smart environment 106 with those particular colors and fabric types to (e.g., object options) associated with the user's user profile. In these embodiments, object modifying system 100 may display the different object options to the user in the interactive model 116. In these embodiments, the user may accept the object option generated, the user may decline the object option, or may alternatively select an object option and continue to modify the object.

In some embodiments, object modifying system 100 may be configured to generate two or more interactive models associated with one or more objects. A user may use the two or more interactive models to compare and contrast various object parameters 106 and modifications. In some embodiments, object modifying system 100 may be configured to merge the two or more interactive models into a single modified design.

In some embodiments, object modifying system 100 may be configured to receive one or more images (e.g., 2D and/or 3D images) selected by a user. A user may use the one or more images to perform modifications on object 102. For example, a user may select images of a preferred surface texture the user would like on object 102. In these embodiments, object modifying system 100 may receive this image and apply/modify it to the interactive model of the object to allow a user to view how the object may look with the particular surface texture.

In embodiments, object modifying system 100 may be configured to duplicate interactive model associated with one location to another location. In an example embodiment, a user may want to share the altered/modified design of the object 102 to another party or parties (e.g., other users). While in some embodiments, the user and other part may be located in a similar space or one location (e.g., same room), in other embodiments, the user and other party may be separated by a distance (e.g., different floor of an office building, different continent, etc.). In embodiments, object modifying system 100 may be configured to generate a different smart environment 108, the same smart environment 108, or similar smart environment 108 (e.g., interactive model of an object) to each of the users at the various locations.

In an example embodiment, a user may have a question regarding how to assemble a particular product (e.g., object). In such embodiments, object modifying system 100 may generate an interactive model of the object that reflects where the user is in the assembly process (e.g., modifications may be associated with steps completed during assembly). This interactive model may be displayed not only to a user, but to a customer service representative (e.g., other party), regardless of the distance separating the two. The customer service representative and the user may interact with their respective interactive models. These interactions or modifications may be reflected in the interactive model of the user and customer service representative. This may allow for more effective communication between parties as each party can clearly visualize how the other has approached the problem and how the problem may be resolved.

Figure 2:
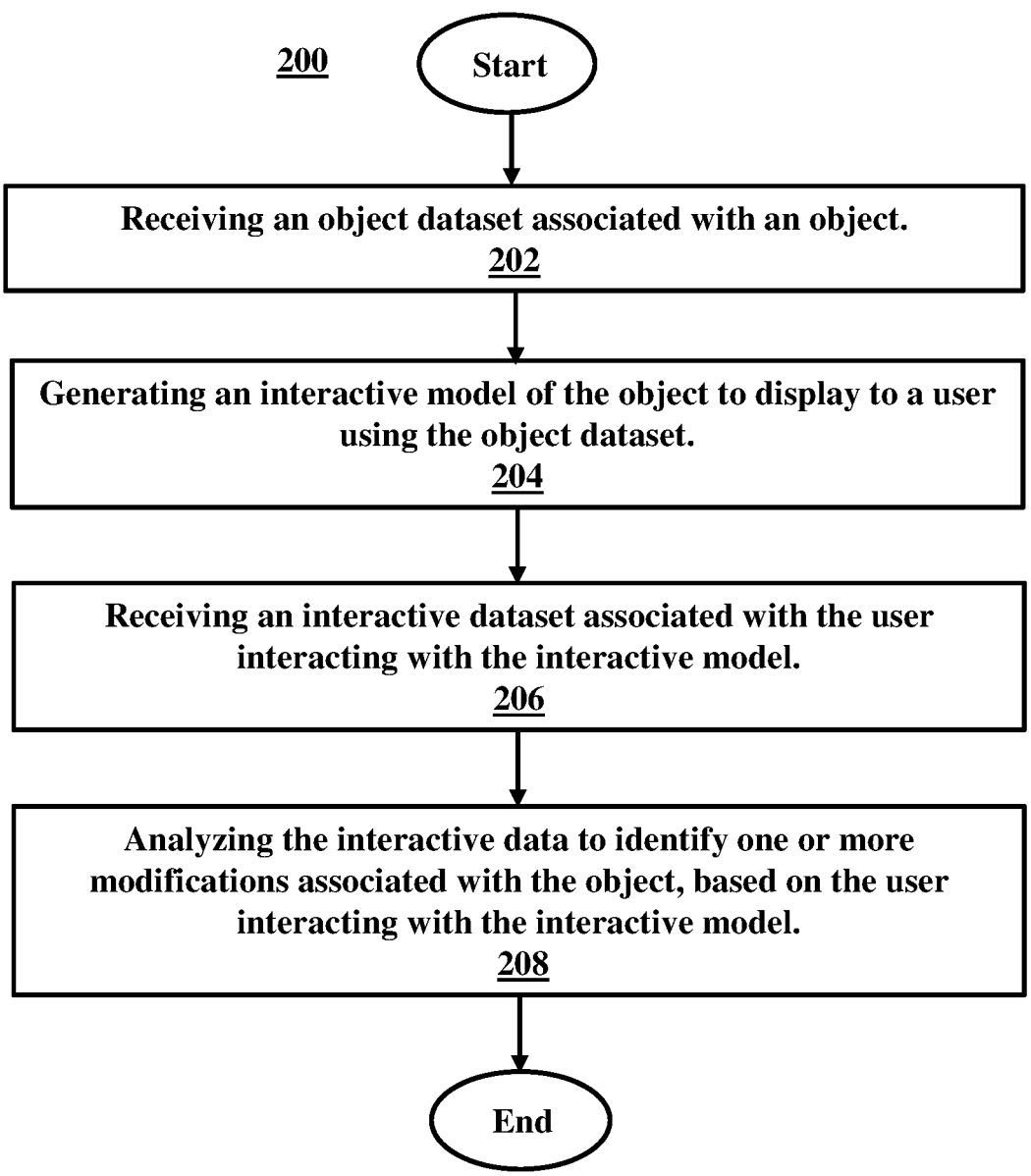
FIG. 2 illustrates a flowchart of a method for modifying an object, in accordance with embodiments of the present disclosure.

Referring now to FIG. 2, a flowchart illustrating an example method 200 for modifying an object in a smart environment (e.g., interactive model), in accordance with embodiments of the present disclosure. FIG. 2 provides an illustration of only one implementation and does not imply any limitations with regard to the environments in which different embodiments may be implemented. Many modifications to the depicted environment may be made by those skilled in the art without departing from the scope of the invention as recited by the claims.

In some embodiments, the method 200 begins at operation 202 where a processor may receive an object dataset associated with an object. In some embodiments, the method 200 proceeds to operation 204.

At operation 204, a processor may generate an interactive model of the object to display to a user using the object dataset. In some embodiments, the method 200 proceeds to operation 206.

At operation 206, a processor may receive an interaction dataset associated with the user interacting with the interactive model. In some embodiments, the method 200 proceeds to operation 208.

At operation 208, a processor may analyze the interactive data to identify one or more modifications to the object, based on the user interacting with the interactive model. In some embodiments, as depicted in FIG. 2, after operation 208, the method 200 may end.

In some embodiments, discussed below there are one or more operations of the method 200 not depicted for the sake of brevity and which are discussed throughout this disclosure. Accordingly, in some embodiments, the processor may intermittently or continuously update the interactive model. In some embodiments, this updating may be based, at least in part, on the one or more modifications. The process of updating the interactive model forms an updated interactive module that includes the modifications made by a user.

In some embodiments, the processor may generate a modified design plan of the object based on the one or more modifications the user made to the interactive model. Based on this modified design plan, the processor may be configured to produce the object as customized by the user.

In some embodiments, the processor may generate a modified design plan of the object based on the one or more modifications the user made to the interactive model. In these embodiments, the processor may analyze the modified design plan of the object for a level of object integrity. In embodiments where the processor determines the level of object integrity exceeds a minimum threshold level, the processor may issue the user a notification, wherein the notification indicates the object is valid. In embodiments where the processor determines the level of object integrity does not exceed a minimum threshold level, the processor may analyze the modified design plan and the object dataset to determine one or more recommended modifications. These one or more recommended modifications may be issued to the user in a notification.

In some embodiments, the processor may analyze a user profile associated with the user. In these embodiments, the user profile may include one or more user preferences. The processor may automatically generate one or more object options to the user based, at least in part on, these one or more user preferences and the object dataset.

It is noted that various aspects of the present disclosure are described by narrative text, flowcharts, block diagrams of computer systems and/or block diagrams of the machine logic included in computer program product (CPP) embodiments. With respect to any flowcharts (depending upon the technology involved) the operations can be performed in a different order than what is shown in the flowchart. For example, two operations shown in successive flowchart blocks may be performed in reverse order, as a single integrated step, concurrently, or in a manner at least partially overlapping in time. A computer program product embodiment ("CPP embodiment") is a term used in the present disclosure that may describe any set of one or more storage media (or "mediums") collectively included in a set of one or more storage devices. The storage media may collectively include machine readable code corresponding to instructions and/or data for performing computer operations. A "storage device" may refer to any tangible hardware or device that can retain and store instructions for use by a computer processor. Without limitation, the computer readable storage medium may include an electronic storage medium, a magnetic storage medium, an optical storage medium, an electromagnetic storage medium, a semiconductor storage medium, a mechanical storage medium, and/or any combination thereof. Some known types of storage devices that include mediums referenced herein may include a diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination thereof. A computer-readable storage medium should not be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As understood by those skilled in the art, data is typically moved at some occasional points in time during normal operations of a storage device, such as during access, de-fragmentation or garbage collection, but this does not render the storage device as transitory because the data is not transitory while it is stored.

Figure 3:
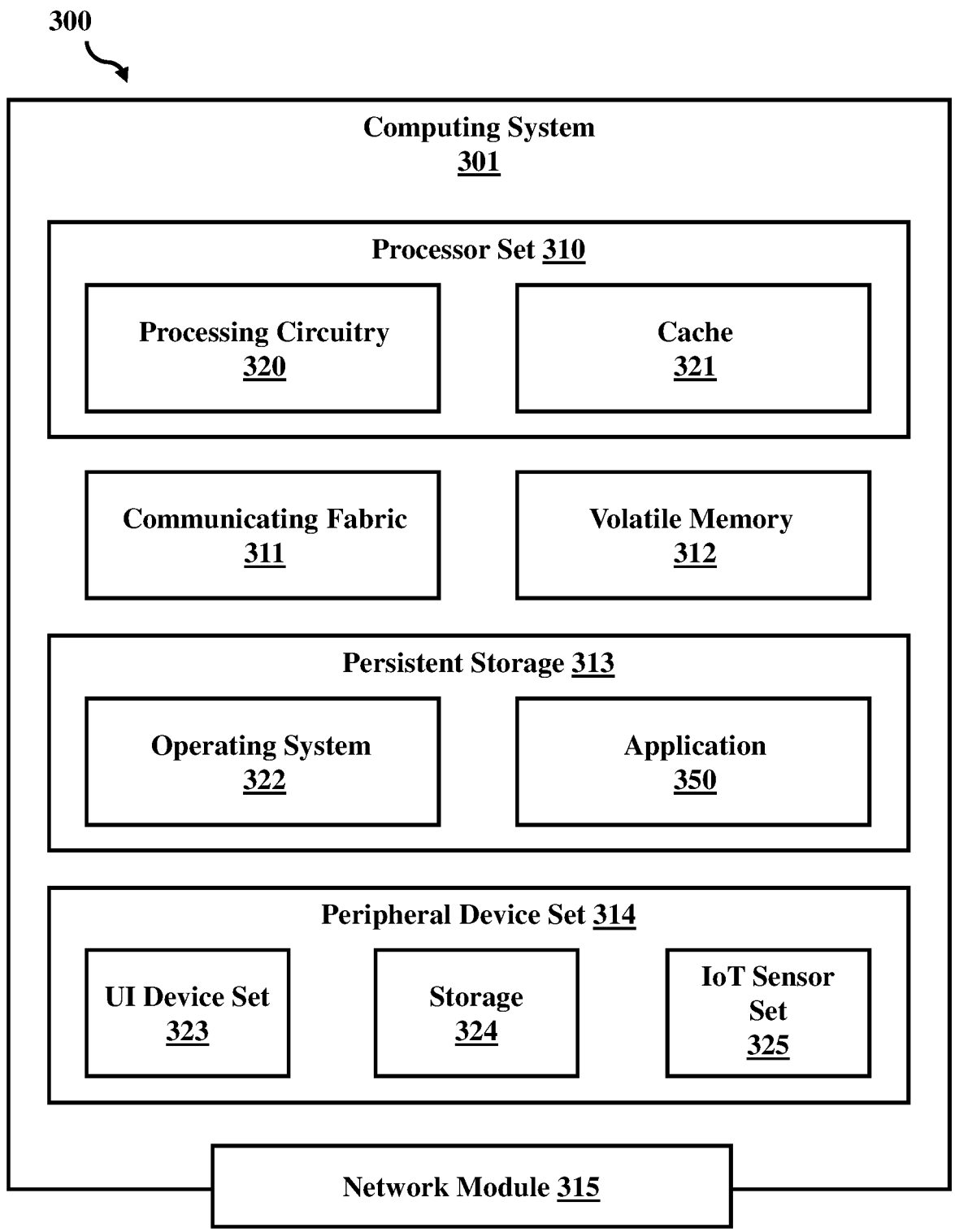
FIG. 3 depicts a block diagram illustrating an embodiment of a computer system and the components thereof, upon which embodiments described herein may be implemented in accordance with the present disclosure.

Referring now to FIG. 3, illustrated is a block diagram describing an embodiment of a computing system 301 within in a computing environment, which may be a simplified example of a computing device (i.e., a physical bare metal system and/or a virtual system) capable of performing the computing operations described herein. Computing system 301 may be representative of the one or more computing systems or devices implemented in accordance with the embodiments of the present disclosure and further described below in detail. It should be appreciated that FIG. 3 provides only an illustration of one implementation of a computing system 301 and does not imply any limitations regarding the environments in which different embodiments may be implemented. In general, the components illustrated in FIG. 3 may be representative of an electronic device, either physical or virtualized, capable of executing machine-readable program instructions.

Embodiments of computing system 301 may take the form of a desktop computer, laptop computer, tablet computer, smart phone, smart watch or other wearable computer, mainframe computer, server, quantum computer, a non-conventional computer system such as an autonomous vehicle or home appliance, or any other form of computer or mobile device now known or to be developed in the future that is capable of running a program 350, accessing a network 302 or querying a database, such as remote database 330. Performance of a computer-implemented method executed by a computing system 301 may be distributed among multiple computers and/or between multiple locations. Computing system 301 may be located as part of a cloud network, even though it is not shown within a cloud in FIGS. 3-2. Moreover, computing system 301 is not required to be in a cloud network except to any extent as may be affirmatively indicated.

Processor set 310 includes one, or more, computer processors of any type now known or to be developed in the future. Processing circuitry 320 may be distributed over multiple packages. For example, multiple, coordinated integrated circuit chips. Processing circuitry 320 may implement multiple processor threads and/or multiple processor cores. Cache 321 may refer to memory that is located on the processor chip package(s) and/or may be used for data or code that can be made available for rapid access by the threads or cores running on processor set 310. Cache 321 memories can be organized into multiple levels depending upon relative proximity to the processing circuitry 320. Alternatively, some, or all of cache 321 of processor set 310 may be located "off chip." In some computing environments, processor set 310 may be designed for working with qubits and performing quantum computing.

Computer readable program instructions can be loaded onto computing system 301 to cause a series of operational steps to be performed by processor set 310 of computing system 301 and thereby implement a computer-implemented method. Execution of the instructions can instantiate the methods specified in flowcharts and/or narrative descriptions of computer-implemented methods included in this specification (collectively referred to as "the inventive methods"). The computer readable program instructions can be stored in various types of computer readable storage media, such as cache 321 and the other storage media discussed herein. The program instructions, and associated data, can be accessed by processor set 310 to control and direct performance of the inventive methods. In computing environments of FIGS. 3-2, at least some of the instructions for performing the inventive methods may be stored in persistent storage 313, volatile memory 312, and/or cache 321, as application(s) 350 comprising one or more running processes, services, programs and installed components thereof. For example, program instructions, processes, services and installed components thereof may include the components and/or sub-components of the system 100 as shown in FIG. 1.

Communication fabric 311 may refer to signal conduction paths that may allow the various components of computing system 301 to communicate with each other. For example, communications fabric 311 can provide for electronic communication among the processor set 310, volatile memory 312, persistent storage 313, peripheral device set 314 and/or network module 315. Communication fabric 311 can be made of switches and/or electrically conductive paths, such as the switches and electrically conductive paths that make up busses, bridges, physical input/output ports and the like. Other types of signal communication paths may be used, such as fiber optic communication paths and/or wireless communication paths.

Volatile memory 312 may refer to any type of volatile memory now known or to be developed in the future, and may be characterized by random access, but this is not required unless affirmatively indicated. Examples include dynamic type random access memory (RAM) or static type RAM. In computing system 301, the volatile memory 312 is located in a single package and can be internal to computing system 301, but, alternatively or additionally, the volatile memory 312 may be distributed over multiple packages and/or located externally with respect to computing system 301. Application 350, along with any program(s), processes, services, and installed components thereof, described herein, may be stored in volatile memory 312 and/or persistent storage 313 for execution and/or access by one or more of the respective processor sets 310 of the computing system 301.

Persistent storage 313 can be any form of non-volatile storage for computers that may be currently known or developed in the future. The non-volatility of this storage means that the stored data may be maintained regardless of whether power is being supplied to computing system 301 and/or directly to persistent storage 313. Persistent storage 313 may be a read only memory (ROM), however, at least a portion of the persistent storage 313 may allow writing of data, deletion of data and/or re-writing of data. Some forms of persistent storage 313 may include magnetic disks, solid-state storage devices, hard drives, flash-based memory, erasable read-only memories (EPROM) and semi-conductor storage devices. Operating system 322 may take several forms, such as various known proprietary operating systems or open-source Portable Operating System Interface type operating systems that employ a kernel.

Peripheral device set 314 includes one or more peripheral devices connected to computing system 301. For example, via an input/output (I/O interface). Data communication connections between the peripheral devices and the other components of computing system 301 may be implemented using various methods. For example, through connections using Bluetooth, Near-Field Communication (NFC), wired connections or cables (such as universal serial bus (USB) type cables), insertion type connections (for example, secure digital (SD) card), connections made though local area communication networks and/or wide area networks such as the internet. In various embodiments, UI device set 323 may include components such as a display screen, speaker, microphone, wearable devices (such as goggles, headsets and smart watches), keyboard, mouse, printer, touchpad, game controllers, and haptic feedback devices. Storage 324 can include external storage, such as an external hard drive, or insertable storage, such as an SD card. Storage 324 may be persistent and/or volatile. In some embodiments, storage 324 may take the form of a quantum computing storage device for storing data in the form of qubits. In some embodiments, networks of computing systems 301 may utilize clustered computing and components acting as a single pool of seamless resources when accessed through a network by one or more computing systems 301. For example, a storage area network (SAN) that is shared by multiple, geographically distributed computer systems 301 or network-attached storage (NAS) applications. IoT sensor set 325 can be made up of sensors that can be used in Internet-of-Things applications. For example, a sensor may be a temperature sensor, motion sensor, infrared sensor or any other type of known sensor type.

Network module 315 may include a collection of computer software, hardware, and/or firmware that allows computing system 301 to communicate with other computer systems through a network 302, such as a LAN or WAN. Network module 315 may include hardware, such as modems or Wi-Fi signal transceivers, software for packetizing and/or de-packetizing data for communication network transmission, and/or web browser software for communicating data over the network. In some embodiments, network control functions and network forwarding functions of network module 315 are performed on the same physical hardware device. In other embodiments (for example, embodiments that utilize software-defined networking (SDN)), the control functions and the forwarding functions of network module 315 can be performed on physically separate devices, such that the control functions manage several different network hardware devices. Computer readable program instructions for performing the inventive methods can typically be downloaded to computing system 301 from an external computer or external storage device through a network adapter card or network interface included in network module 315.

Figure 4:
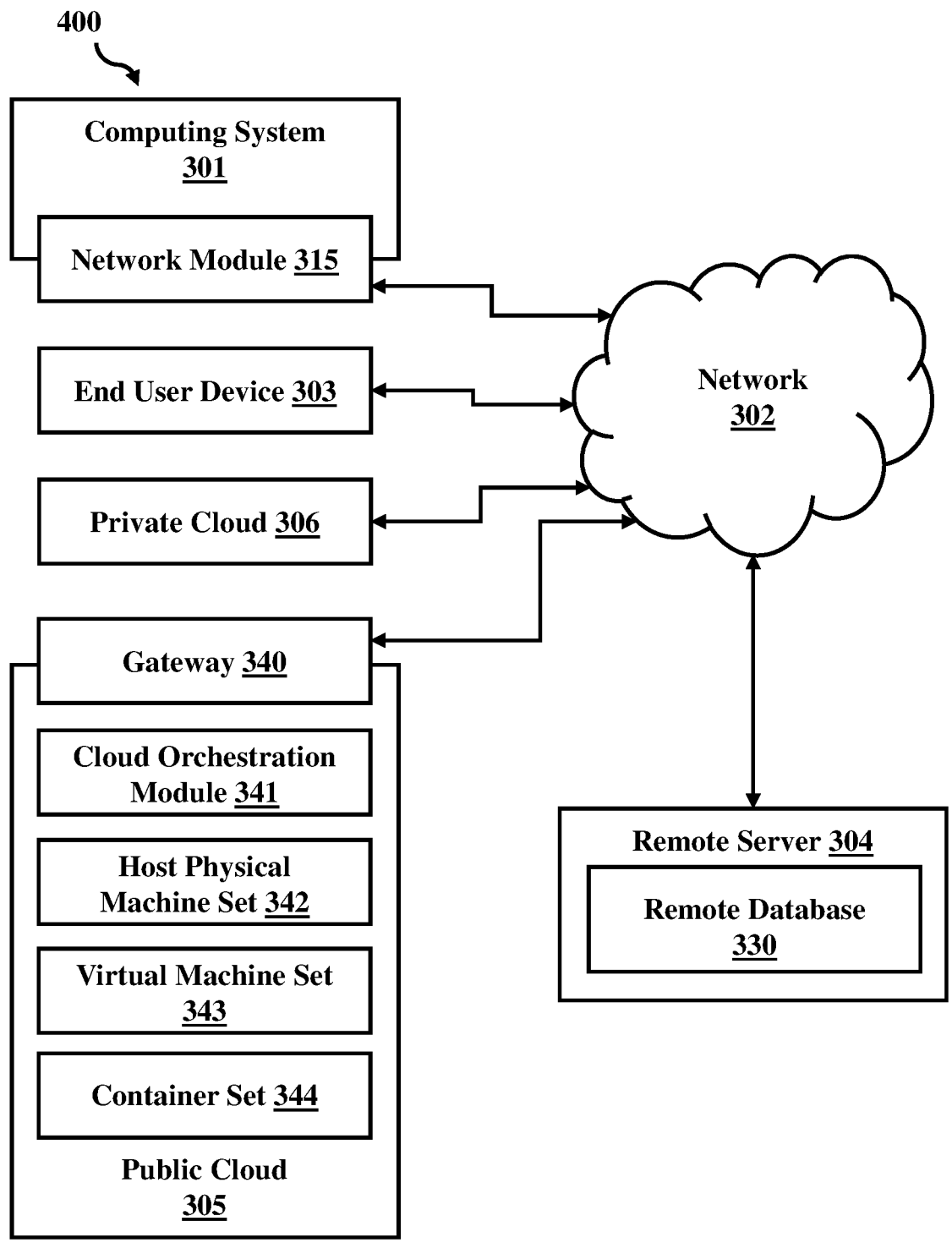
FIG. 4 depicts a block diagram illustrating an extension of the computing system environment of FIG. 1, wherein the computer systems are configured to operate in a network environment (including a cloud environment), and perform methods described herein in accordance with the present disclosure.

Continuing, FIG. 4 depicts a computing environment 400 which may be an extension of the computing environment 300 of FIG. 3, operating as part of a network. In addition to computing system 301, computing environment 400 can include a network 302 such as a wide area network (WAN) (or another type of computer network) connecting computing system 301 to an end user device (EUD) 303, remote server 304, public cloud 305, and/or private cloud 306. In this embodiment, computing system 301 includes processor set 310 (including processing circuitry 340 and cache 321), communication fabric 311, volatile memory 312, persistent storage 313 (including operating system 322 and program(s) 350, as identified above), peripheral device set 314 (including user interface (UI), device set 323, storage 324, Internet of Things (IOT) sensor set 325), and network module 315. Remote server 304 includes remote database 330. Public cloud 305 includes gateway 340, cloud orchestration module 341, host physical machine set 342, virtual machine set 343, and/or container set 344.

Network 302 may be comprised of wired or wireless connections. For example, connections may be comprised of computer hardware such as copper transmission cables, optical transmission fibers, wireless transmission, routers, firewalls, switches, gateway computers and/or edge servers. Network 302 may be described as any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. Other types of networks that can be used to interconnect the various computer systems 301, end user devices 303, remote servers 304, private cloud 306 and/or public cloud 305 may include Wireless Local Area Networks (WLANs), home area network (HAN), backbone networks (BBN), peer to peer networks (P2P), campus networks, enterprise networks, the Internet, single tenant or multi-tenant cloud computing networks, the Public Switched Telephone Network (PSTN), and any other network or network topology known by a person skilled in the art to interconnect computing systems 301.

End user device 303 can include any computer device that can be used and/or controlled by an end user (for example, a customer of an enterprise that operates computing system 301) and may take any of the forms discussed above in connection with computing system 301. EUD 303 may receive helpful and useful data from the operations of computing system 301. For example, in a hypothetical case where computing system 301 is designed to provide a recommendation to an end user, this recommendation may be communicated from network module 315 of computing system 301 through WAN 302 to EUD 303. In this example, EUD 303 can display, or otherwise present, the recommendation to an end user. In some embodiments, EUD 303 may be a client device, such as thin client, thick client, mobile computing device such as a smart phone, mainframe computer, desktop computer and so on.

Remote server 304 may be any computing systems that serves at least some data and/or functionality to computing system 301. Remote server 304 may be controlled and used by the same entity that operates computing system 301. Remote server 304 represents the machine(s) that collect and store helpful and useful data for use by other computers, such as computing system 301. For example, in a hypothetical case where computing system 301 is designed and programmed to provide a recommendation based on historical data, the historical data may be provided to computing system 301 from remote database 330 of remote server 304.

Public cloud 305 may be any computing systems available for use by multiple entities that provide on-demand availability of computer system resources and/or other computer capabilities including data storage (cloud storage) and computing power, without direct active management by the user. The direct and active management of the computing resources of public cloud 305 can be performed by the computer hardware and/or software of cloud orchestration module 341. The computing resources provided by public cloud 305 can be implemented by virtual computing environments that run on various computers making up the computers of host physical machine set 342, and/or the universe of physical computers in and/or available to public cloud 305. The virtual computing environments (VCEs) may take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through network 302.

VCEs can be stored as "images." A new active instance of the VCE can be instantiated from the image. Two types of VCEs may include virtual machines and containers. A container is a VCE that uses operating-system-level virtualization, in which the kernel allows the existence of multiple isolated user-space instances, called containers. These isolated user-space instances may behave as physical computers from the point of view of programs 350 running in them. An application 350 running on an operating system 322 can utilize all resources of that computer, such as connected devices, files and folders, network shares, CPU power, and quantifiable hardware capabilities. Applications 350 running inside a container of container set 344 may only use the contents of the container and devices assigned to the container, a feature which may be referred to as containerization.

Private cloud 306 may be similar to public cloud 305, except that the computing resources may only be available for use by a single enterprise. While private cloud 306 is depicted as being in communication with network 302 (such as the Internet), in other embodiments a private cloud 306 may be disconnected from the internet entirely and only accessible through a local/private network. A hybrid cloud may refer to a composition of multiple clouds of different types (for example, private, community or public cloud types), and the plurality of clouds may be implemented or operated by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 may be both part of a larger hybrid cloud environment.

What is claimed is:

1. A computer-implemented method for comprising:
   receiving, by a processor, an object dataset associated with an object;
   generating, using a Generative Adversarial Network (GAN), an interactive model of the object using the object dataset, wherein the interactive model is a 3 dimensional (3D) interactive model that is displayed to a user via a Virtual Reality (VR) headset;
   receiving, at least partially from a wearable device tracking hand motion, an interaction dataset associated with the user interacting with the interactive model, wherein the interaction dataset includes information related to a directional force of the hand motion on the interactive model of the object;
   analyzing the interaction dataset to identify one or more modifications to the object, based on the user interacting with the interactive model;
   generating a modified design plan of the object based on the one or more modifications the user made to the interactive model;
   analyzing the modified design plan of the object for a level of object integrity, wherein the level of object integrity relates to being producible;
   determining the level of object integrity does not exceed a minimum threshold level;
   analyzing the modified design plan and the object dataset to determine one or more recommended modifications; and
   issuing the one or more recommended modifications to the user in a notification, wherein the one or more recommended modifications changes the modified design plan to make it producible.

2. The computer-implemented method of claim 1, the method further comprising:
   updating the interactive model based, at least in part, on the one or more modifications, wherein an updated interactive model is formed by updating the interactive model.

3. The computer-implemented method of claim 1, the method further comprising:
   producing the object based on the modified design plan with the one or more recommended modifications.

4. The computer-implemented method of claim 1, the method further comprising:
   analyzing a user profile associated with the user, wherein the user profile includes one or more user preferences; and
   automatically generating one or more object options to the user based, at least in part on, the one or more user preferences and the object dataset.

5. The computer-implemented method of claim 1, wherein the interaction dataset further includes a hand speed as the user interacts with the interactive model of the object.

6. The computer-implemented method of claim 1, wherein the interaction dataset is received, at least partially, from an ultrasound scanning device.

7. A system comprising:
   a memory; and
   a processor in communication with the memory, the processor being configured to perform operations comprising:
   receiving an object dataset associated with an object;
   generating, using a Generative Adversarial Network (GAN), an interactive model of the object using the object dataset, wherein the interactive model is a 3 dimensional (3D) interactive model that is displayed to a user via a Virtual Reality (VR) headset;
   receiving, at least partially from a wearable device tracking hand motion, an interaction dataset associated with the user interacting with the interactive model, wherein the interaction dataset includes information related to a directional force of the hand motion on the interactive model of the object;
   analyzing the interaction dataset to identify one or more modifications to the object, based on the user interacting with the interactive model;
   generating a modified design plan of the object based on the one or more modifications the user made to the interactive model;
   analyzing the modified design plan of the object for a level of object integrity, wherein the level of object integrity relates to being producible;
   determining the level of object integrity does not exceed a minimum threshold level;
   analyzing the modified design plan and the object dataset to determine one or more recommended modifications; and
   issuing the one or more recommended modifications to the user in a notification, wherein the one or more recommended modifications changes the modified design plan to make it producible.

8. The system of claim 7, the processor being configured to perform operations further comprising:
updating the interactive model based, at least in part, on the one or more modifications, wherein an updated interactive model is formed by updating the interactive model.

9. The system of claim 7, the processor being configured to perform operations further comprising:
producing the object based on the modified design plan with the one or more recommended modifications.

10. The system of claim 7, the processor being configured to perform operations further comprising:
analyzing a user profile associated with the user, wherein the user profile includes one or more user preferences; and
automatically generating one or more object options to the user based, at least in part on, the one or more user preferences and the object dataset.

11. The system of claim 7, wherein the interaction dataset further includes a hand speed as the user interacts with the interactive model of the object.

12. The system of claim 7, wherein the interaction dataset is received, at least partially, from an ultrasound scanning device.

13. A computer program product comprising a computer readable storage medium having program instructions embodied therewith, the program instructions executable by a processor to cause the processor to perform operations, the operations comprising:
receiving an object dataset associated with an object;
generating, using a Generative Adversarial Network (GAN), an interactive model of the object using the object dataset, wherein the interactive model is a 3 dimensional (3D) interactive model that is displayed to a user via a Virtual Reality (VR) headset;
receiving, at least partially from a wearable device tracking hand motion, an interaction dataset associated with the user interacting with the interactive model, wherein the interaction dataset includes information related to a directional force of the hand motion on the interactive model of the object;
analyzing the interaction dataset to identify one or more modifications to the object, based on the user interacting with the interactive model;
generating a modified design plan of the object based on the one or more modifications the user made to the interactive model;
analyzing the modified design plan of the object for a level of object integrity, wherein the level of object integrity relates to being producible;
determining the level of object integrity does not exceed a minimum threshold level;
analyzing the modified design plan and the object dataset to determine one or more recommended modifications; and
issuing the one or more recommended modifications to the user in a notification, wherein the one or more recommended modifications changes the modified design plan to make it producible.

14. The computer program product of claim 13, the program instructions executable by the processor to cause the processor to perform operations further comprising:
producing the object based on the modified design plan with the one or more recommended modifications.

15. The computer program product of claim 13, the program instructions executable by the processor to cause the processor to perform operations further comprising:
updating the interactive model based, at least in part, on the one or more modifications, wherein an updated interactive model is formed by updating the interactive model.

16. The computer program product of claim 13, the program instructions executable by the processor to cause the processor to perform operations further comprising:
analyzing a user profile associated with the user, wherein the user profile includes one or more user preferences; and
automatically generating one or more object options to the user based, at least in part on, the one or more user preferences and the object dataset.

17. The computer program product of claim 13, wherein the interaction dataset further includes a hand speed as the user interacts with the interactive model of the object.

18. The computer program product of claim 13, wherein the interaction dataset is received, at least partially, from an ultrasound scanning device.

* * * * *